(12) United States Patent
Konstadinidis et al.

(10) Patent No.: US 8,648,645 B2
(45) Date of Patent: Feb. 11, 2014

(54) MICROPROCESSOR PERFORMANCE AND POWER OPTIMIZATION THROUGH SELF CALIBRATED INDUCTIVE VOLTAGE DROOP MONITORING AND CORRECTION

(75) Inventors: Georgios Konstadinidis, San Jose, CA (US); Sudhakar Bobba, Santa Clara, CA (US); David Greenhill, Portola Valley, CA (US)

(73) Assignee: Oracle International Corporation, Redwood City, CA (US)

( * ) Notice: Subject to any disclaimer, the term of this patent is extended or adjusted under 35 U.S.C. 154(b) by 868 days.

(21) Appl. No.: 12/787,135

(22) Filed: May 25, 2010

(65) Prior Publication Data

US 2011/0291630 A1    Dec. 1, 2011

(51) Int. Cl.
*H03K 3/01* (2006.01)

(52) U.S. Cl.
USPC .......................................... 327/534; 327/538

(58) Field of Classification Search
USPC .................................................. 327/538, 540
See application file for complete search history.

(56) References Cited

U.S. PATENT DOCUMENTS

| | | | |
|---|---|---|---|
| 6,538,497 B2 * | 3/2003 | Thomas et al. | 327/543 |
| 6,653,891 B1 * | 11/2003 | Hazucha | 327/540 |
| 7,902,800 B2 * | 3/2011 | Jain et al. | 323/224 |

* cited by examiner

*Primary Examiner* — Hai L Nguyen
(74) *Attorney, Agent, or Firm* — Polsinelli PC

(57) ABSTRACT

Disclosed is a digital voltage regulator system and method for mitigating voltage droop in an integrated circuit. If an unacceptable voltage droop is detected, the digital voltage regulator may take action to allow the power supply voltage to recover. A digital voltage regulator in accordance with embodiments discussed herein detects voltage droop by comparing a power supply voltage measurement with a threshold voltage. The threshold voltage may be calibrated based on power supply voltage measurements taken while the integrated circuit is operating.

15 Claims, 14 Drawing Sheets

//MICROPROCESSOR PERFORMANCE AND POWER OPTIMIZATION THROUGH SELF CALIBRATED INDUCTIVE VOLTAGE DROOP MONITORING AND CORRECTION

TECHNICAL FIELD

Embodiments are generally related to digital voltage regulators, and more specifically to methods and apparatus for regulating voltages within an integrated circuit.

BACKGROUND

Under certain operating conditions a phenomenon referred to a "voltage droop" may lead to an integrated circuit's power supply falling below proper operating levels. A voltage droop refers to a loss of supply voltage as a device tries to drive a load. For example, when power is supplied to a microprocessor, the sudden increase in current through the microprocessor may cause a loss in the supply voltage due to the package inductance. In other words, the sudden increase in the current drawn by the microprocessor causes a voltage droop because there is a high rate of change of current through the microprocessor package inductance.

Voltage droop may occur during heavy loading conditions. In this case, the amount of current demanded by the processor exceeds that which can be provided by the power supply and, as result, the power supply voltage at the transistor level droops. Voltage droop may also occur under conditions where the processor draws current at a certain frequency. Depending on the power variation frequency, the processor may hit the resonance frequency associated with the combination of the package inductance and the chip capacitance. In this case, a voltage droop can occur at the voltage supply at the transistor level. In order to prevent an integrated circuit from operating outside of the appropriate range of power supply voltages, it may be desirable to monitor the power supply voltage and to take steps to mitigate voltage droop.

SUMMARY

Embodiments discussed herein are directed to digital voltage regulator circuits. Digital voltage regulator circuits may be deployed in connection with an integrated circuit and used to prevent the integrated circuit's power supply from dropping below a certain threshold voltage. During heavy usage or heavy loading conditions, digital logic circuits or other components of an integrated circuit may demand high amounts of power from the integrated circuit's power supply. In these high usage conditions, an excessive amount of current may be drawn from the power supply resulting in a drop in the voltage of the power supply. If the voltage of the power supply drops below a certain level, the reduced power supply voltage may be insufficient to ensure proper operation of the integrated circuit. Accordingly, integrated circuits typically include voltage regulator circuits that prevent these low voltage conditions from occurring.

One embodiment is directed to a digital voltage regulator component of an integrated circuit, the digital voltage regulator comprising: a voltage monitor configured to sample a power supply voltage of an integrated circuit during a clock cycle and configured to output a power supply voltage measurement; a voltage reference circuit connected to the voltage monitor and configured to output a voltage reference signal that is initially calibrated based on a first power supply voltage measurement received from the voltage monitor; and a comparator connected to the voltage monitor and to the voltage reference circuit and configured to assert a voltage droop signal when a power supply voltage measurement received from the voltage monitor falls below the voltage reference signal received from the voltage reference circuit; wherein the voltage reference circuit receives the voltage droop signal from the comparator and adjusts the voltage reference signal based on a plurality of voltage droop signal values received over time.

One embodiment is directed to a method of regulating voltage in an integrated circuit, the method comprising: receiving a power supply voltage measurement and a voltage reference signal; outputting a voltage droop signal based on the power supply voltage measurement and the voltage reference signal, the voltage reference signal produced by: setting a voltage reference level based on an initial power supply voltage measurement; and shifting the voltage reference level based on a plurality of voltage droop signals received over time.

One embodiment is directed to a digital voltage regulator slice, comprising: a voltage monitor configured to sample a power supply voltage of an integrated circuit during a clock cycle and configured to output a power supply voltage measurement, the voltage monitor having an output operable to connect to one or more subsequent digital voltage regulator slices; a priority encoder configured to receive the output from the voltage monitor and to provide an encoded output based on the output from the voltage monitor, the encoder output representing a sampled power supply voltage; a plurality of calibration flip-flops connected to the priority encoder, the plurality of calibration flip-flops configured to store the output from the priority encoder as a threshold voltage at a first time and to thereafter shift the threshold voltage based on a shift signal, the plurality of calibration flip-flops having an output operable to connect to the one or more subsequent digital voltage regulator slices; and a comparator connected to the priority encoder and to the plurality of calibration flip-flops and configured to assert a voltage droop slice signal when the power supply voltage represented by the encoded output from the priority encoder falls below the threshold voltage received from the plurality of calibration flip-flops.

DETAILED DESCRIPTION

Embodiments discussed herein are directed to a digital voltage regulator system and method for mitigating voltage droop in an integrated circuit. If an unacceptable voltage droop is detected, the digital voltage regulator may take action such as temporarily suspending the system clock to cause processor operations to cease. Alternatively, the digital voltage regulator may reduce the frequency of the system clock to thereby cause the processor to operate at a reduced speed. In either case, the processor draws less current, thereby allowing the power supply voltage to recover. The digital voltage regulator may continue to suspend or reduce the frequency of the system clock until the unacceptable voltage droop is no longer detected.

A digital voltage regulator in accordance with embodiments discussed herein detects voltage droop by comparing a power supply voltage measurement with a threshold voltage. Power supply voltage measurements that fall below the threshold voltage indicate that the integrated circuit is operating under conditions that are susceptible to producing errors. The threshold voltage is calibrated based on power supply voltage measurements taken while the integrated circuit is operating. Calibrating the threshold voltage in this way eliminates the need to manually set the threshold voltage during the processor design phase. Manually setting of the threshold voltage can be time consuming and costly. Moreover, inaccuracies can result because this is a one time calibration that does not allow for changes that occur over the lifetime of the product. A digital voltage regulator in accordance with embodiments discussed herein avoids these disadvantages by automatically setting and adjusting the threshold voltage while the integrated circuit is operating. In this way, the digital voltage regulator compensates for effects such as temperature changes, long term drift, and aging of the monitor circuits that cause the appropriate threshold voltage to shift over time.

Figure 1:
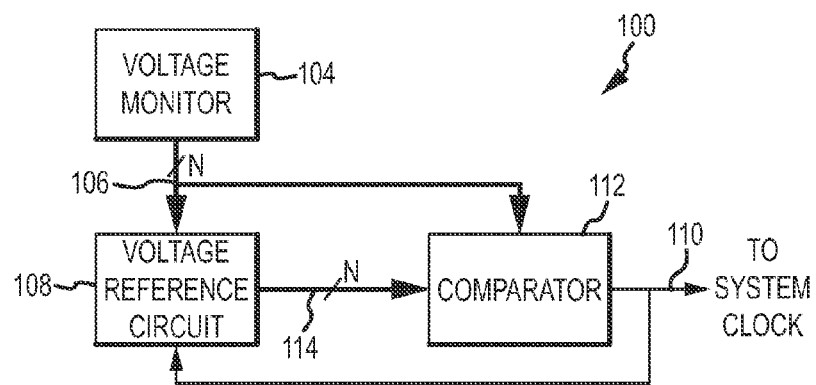
FIG. 1 is a schematic illustration of a digital voltage regulator in accordance with embodiments discussed herein.

A digital voltage regulator that is operable to mitigate voltage droop in an integrated circuit is shown in FIG. 1 and is generally identified by reference numeral 100. The digital voltage regulator 100 includes a voltage monitor 104 that is operable to sample the power supply voltage of an integrated circuit during a cycle of the system clock. The voltage monitor 104 produces an N-bit voltage measurement signal 106 that indicates a power supply voltage measurement. As used herein, an "N-bit" signal is a digital signal containing a certain number of bits. The number of bits included in the voltage measurement signal 106 will vary depending on the application. Generally, the greater the number of bits used in the voltage measurement signal 106, the more precise the power supply voltage measurement will be. However, the number of bits used in the voltage measurement signal 106 may be limited by power consumption and/or space availability constraints. During an initial or power-on calibration, the voltage measurement signal 106 is provided to a voltage reference circuit 108. During normal operation, the voltage measurement signal is provided to a comparator circuit 112.

The comparator 112 is operable to output a voltage droop signal 110 that indicates that the power supply voltage has fallen to an unacceptable level. The voltage droop signal 110 is a single bit digital signal. The voltage droop signal 110 may be asserted to indicate that an unacceptable voltage droop is present. Likewise, the voltage droop signal 110 may be de-asserted to indicate that an unacceptable voltage droop is not present. As used herein, a "1" is used to indicate an asserted signal, and a "0" is used to indicate a de-asserted signal. However, other labeling conventions may be used to indicate the meaning of an asserted or de-asserted signal. It is also noted that a high or low voltage may be used to convey an asserted signal, as is consistent with the logic convention used in a particular application. If the voltage droop signal 110 is asserted, the voltage regulator 100 or other component may take action to mitigate the voltage droop. If the voltage droop signal 110 is de-asserted, the voltage regulator may refrain from taking any action to mitigate voltage droop.

The comparator 112 produces the voltage droop signal 110 based on a comparison between the voltage measurement signal 106 and an N-bit voltage reference signal 114 output from the voltage reference circuit 108. The voltage reference signal 114 indicates a threshold voltage. The comparator 112 performs a bit-wise comparison between the voltage measurement signal 106 and the voltage reference signal 114. This comparison results in single bit value that is output as the voltage droop signal 110. An asserted (logical "1") voltage droop signal 110 will be output if the comparison indicates that the power supply voltage indicated by the voltage measurement signal 106 is below the threshold voltage represented by the voltage reference signal 114. Similarly, a de-asserted (logical "0") voltage droop signal 110 will be output if the comparison indicates that the power supply voltage indicated by the voltage measurement signal 106 is not below the threshold voltage indicated by the voltage reference signal 114. The voltage droop signal 110 is provided to control circuits or other system components operable to disable or reduce the frequency of the system clock in response to an asserted signal. Additionally, the voltage droop signal 110 is fed back to the voltage reference circuit 108 to adjust the voltage reference signal 114.

The voltage reference circuit 108 outputs the voltage reference signal 114, which indicates a threshold voltage. The threshold voltage indicated by the voltage reference signal 114 may be initially set by a power-on calibration that occurs when a first power supply voltage measurement is sent from the voltage monitor 104 to the voltage reference circuit 108. An offset may be added to this first power supply voltage measurement and the resulting value stored as the threshold voltage. As the integrated circuit operates, the voltage reference circuit 108 may use feedback from the comparator 112 to adjust the threshold voltage to thereby calibrate the threshold voltage to an average long term power supply voltage level.

The digital voltage regulator 100 shown in FIG. 1 provides for automatically defining a threshold voltage and for self-calibration of the threshold voltage. This self-calibration allows the threshold voltage to be based on a long term average supply voltage value. Establishing the threshold voltage in this way takes into account both manufacturing process variations and environmental conditions like temperature and workload. The same voltage monitor 104 is used to sample the power supply during an initial or power calibration and during normal operation. During the initial or power-on calibration, a power supply voltage measurement is allowed to pass to the voltage reference circuit 108 to set a threshold voltage. During normal operation, power supply measurements are allowed to pass to the comparator 112 for purposes of mitigating voltage droop. As described herein, normal operation may include both clock management to mitigate voltage droop and further calibration of the threshold voltage based on-going power supply voltage measurements The use of the same delay line for both the calibration mode and the normal mode minimizes the potential errors due to process variations.

Figure 2:
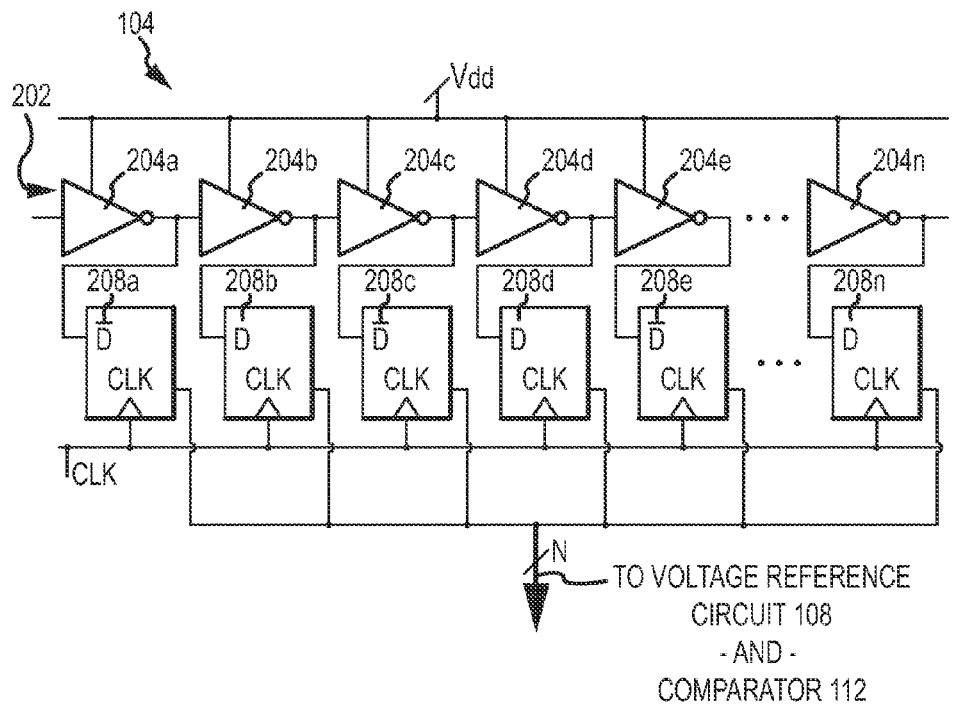
FIG. 2 is a schematic illustration of an embodiment of the voltage monitor component of the digital voltage monitor shown in FIG. 1.

FIG. 2 is an embodiment of the voltage monitor 104 shown in FIG. 1. The voltage monitor 104 shown in FIG. 2 includes a delay chain 202 that includes single rail of interconnected inverters 204a-n. Like other components in the integrated circuit, each inverter 204a-n of the delay chain 202 is powered by the integrated circuit's power supply. The delay that a signal or wavefront experiences when propagating through each inverter 204a-n of the delay chain 202 may depend on fluctuations in the power supply voltage. Each inverter 204a-n may include a circuit element such as a pull-up and/or a pull-down transistor (not shown). These transistors have a switching time that is affected by variations in the power supply voltage. A higher power supply voltage will result in a faster switching time. A lower power supply voltage will result in a slower switching time. Hence, the delay through an inverter 204a-n will be less in a higher power supply voltage situation than the delay in a respectively lower power supply situation.

With this in mind, the delay chain 202 may be used to determine the power supply voltage by measuring the progress of a wavefront down the chain 202. Measuring the progress of the wavefront down a delay chain 202 may be accomplished by a number of flip-flops 208a-n. Each inverter 204a-n in the delay chain 202 includes an output that is connected to an input of a corresponding flip-flop 208a-n. The flip-flops 208a-n are each clocked by a signal that causes them to sample their inputs at a predetermined time. The digital voltage regulator 100 may be calibrated so that the flip-flops 208a-n sample their inputs at a point in time in which the wavefront has partially propagated down the delay chain 202. More particularly, the wavefront may be initiated in the delay chain 202 at a first time instance and sampled by the flip-flops 208a-n at a second time instance. In sampling the delay chain 202, a power supply voltage measurement is stored by the flip-flops 208a-n. Each flip-flop 208a-n holds one bit and together the ordered sequence of bits provides in digital form this power supply voltage measurement.

Figure 3:
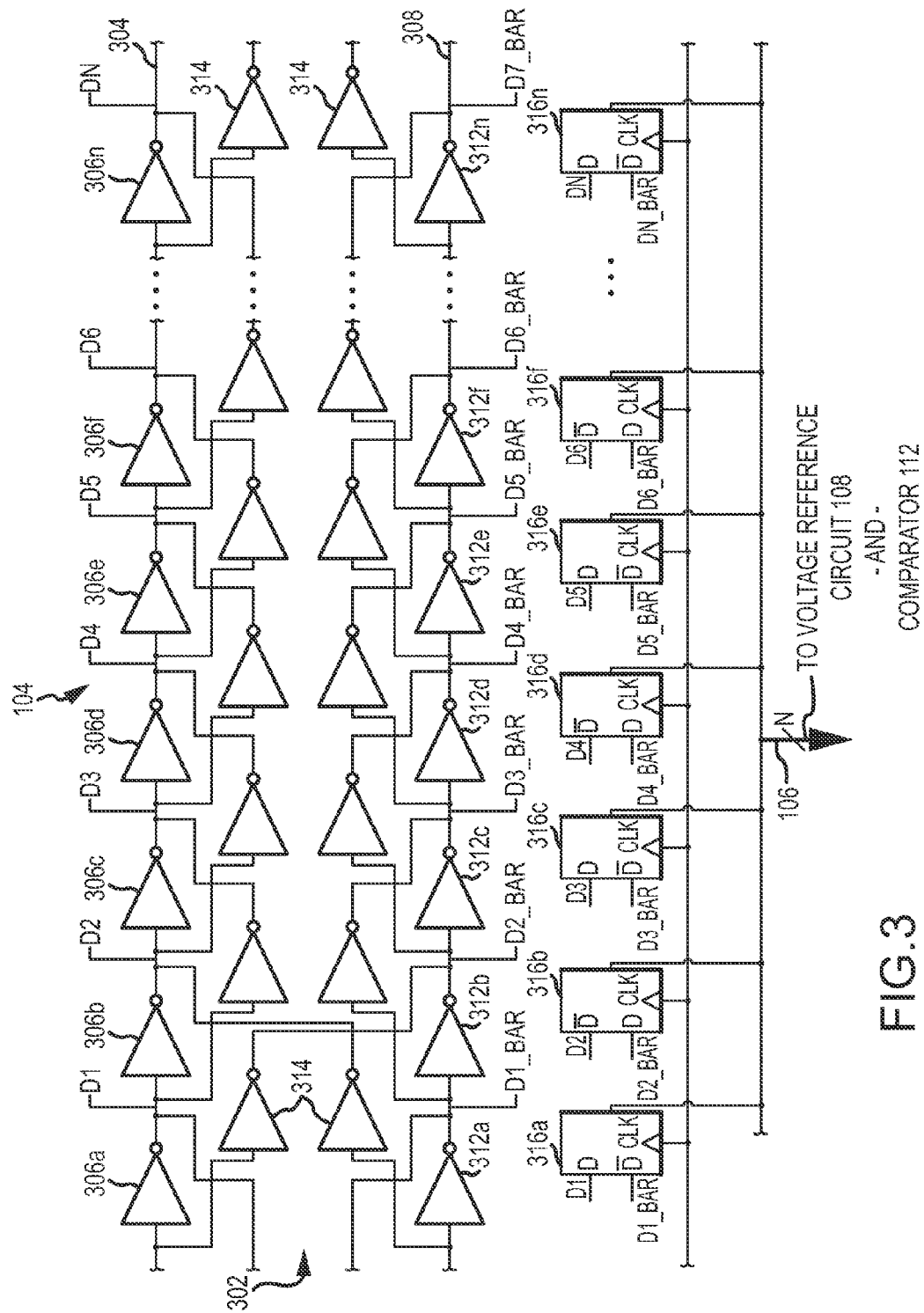
FIG. 3 is a schematic illustration of another embodiment of the voltage monitor component of the digital voltage monitor shown in FIG. 1.

FIG. 3 is another embodiment of the voltage monitor 104 shown in FIG. 1. The voltage monitor 104 embodiment shown in FIG. 3 includes a delay chain 302 that includes two delay chains rails interconnected by means of cross-coupled inverters. The first delay chain rail 304 includes a series of interconnected rail inverters 306a-n. The second delay chain rail 308 includes a series of interconnect rail inverters 312a-n. The delay chain 302 additionally includes a number of cross-couple inverters 314 that interconnect the first delay chain rail 304 with the second delay chain rail 308. A particular cross-couple inverter 314 connects a rail inverter in the first delay chain rail 304 to a rail inverter in the second delay chain rail 308, or connects a rail inverter in the second delay chain rail 308 to a rail inverter in first delay chain rail 304. The cross-couple inverters 314 have a "feed-forward" characteristic. As used herein "feed-forward" refers to a circuit path or element that connects a first circuit node to a second circuit node, the second node being ahead of or "downstream" from the first node with respect to the flow of information in the circuit. With respect to the delay chains, a feed-forward element or path may advance information down the chain a certain number of stages and in so doing bypass intermediate stages.

In the delay chain 302 shown in FIG. 3, each cross-couple inverter 314 feeds forward two stages in the delay chain 302. A cross-couple inverter 314 feeds a signal from the initial input on the first delay chain rail 304 forward past the second rail inverter 306b to the input of the third rail inverter 306c of the second delay chain rail 308. Similarly, a cross-couple inverter 314 feeds a signal from the initial input on the second delay chain rail 308 forward past the second rail inverter 312b to the input of third rail inverter 312c of first delay chain rail 304. This feed-forward-two characteristic is repeated for subsequent stages of the delay chain 302.

Measuring the progress of the wavefront down the delay chain 302 may be accomplished by a number of dual input flip-flops 316a-n. Each dual input flip-flop 316a-n takes one input from the first delay chain rail 304 and another input from the second delay chain rail 308. In this way, each dual input flip-flop 316a-n receives a signal and a simultaneous complement of that signal. The dual input flip-flops 316a-n are each clocked by a signal that causes them to sample their inputs at a predetermined time. The digital voltage regulator 100 may be calibrated so that the dual input flip-flops 316a-n sample their inputs at a point in time in which a wavefront has partially propagated down the delay chain 302. More particularly, the wavefront may be initiated in the delay chain 302 at a first time instance and sampled by the dual input flip-flops 316a-n at a second time instance. In sampling the delay chain 302, a power supply voltage measurement is stored by the dual input flip-flops 316a-n. Each dual input flip-flop 316a-n holds one bit and together the ordered sequence of bits provides in digital form this power supply voltage measurement.

The power supply voltage measurement held by the dual input flip-flops 316a-n is a series of bits arranged from most significant bit to least significant bit. (It should be appreciated that this and the following discussion equally apply to the flip-flops 208a-n.) Each bit corresponds to a stage in the delay chain 302. The value of each bit represents whether or not the wavefront reached the corresponding stage in the delay chain 302 when the delay chain 302 was sampled. For purposes of illustration, say that a value of zero indicates that the wavefront did reach the corresponding stage, and a value of one indicates that the wavefront did not reach the corresponding stage. Accordingly, the power supply voltage measurement will be a series of zeros at the most significant end and series of ones at the least significant end. The most significant one in the power supply voltage measurement will therefore correspond to the location of the wavefront in the delay chain 302 when the delay chain was sampled. The closer the most significant one is to the least significant end of the power supply voltage measurement, the further the wavefront traveled down the delay chain 302. The greater the power supply voltage, the further down the delay chain 302 the wavefront will travel, and vice-verse. Accordingly, the greater the most significant one of the power supply measurement, the lesser is the power supply voltage. The operation of the delay chain 302 is further described in U.S. patent application Ser. No. 12/430,829, filed Apr. 27, 2009 in the name of Sun Microsystems, Inc.; the contents of which are herein incorporated by reference in their entirety.

Figure 4:
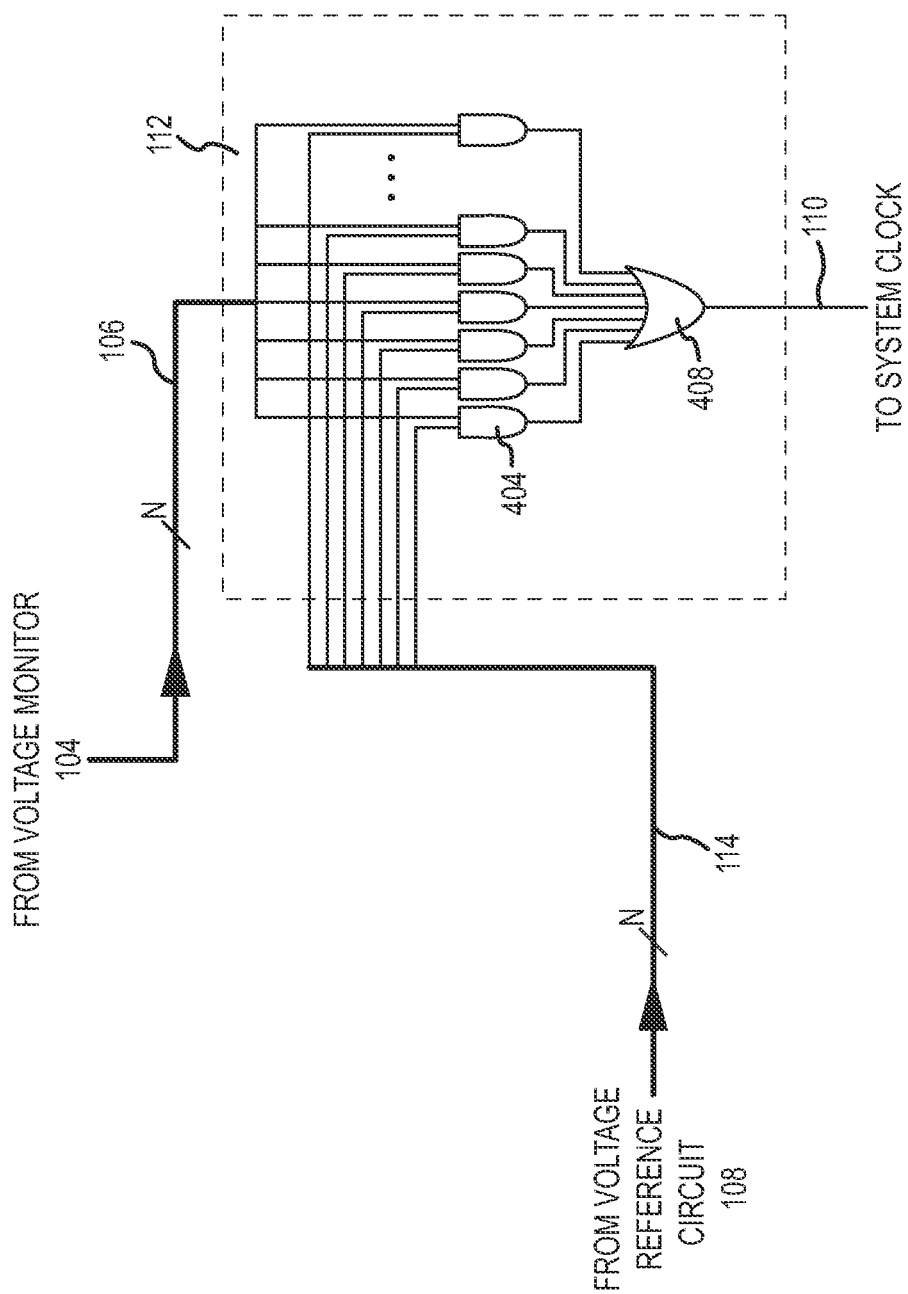
FIG. 4 is a schematic illustration of an embodiment of the comparator of the digital voltage monitor shown in FIG. 1.

As shown in FIG. 4, the N-bit voltage measurement signal 106 is provided from the voltage monitor 104 to the comparator 112, where it is compared against an N-bit voltage reference signal 114. The voltage measurement signal 106 transmits a power supply voltage measurement represented by an ordered sequence of bits, each bit representing a voltage level. The voltage reference signal 114 transmits a threshold voltage represented by an ordered sequence of bits, each bit representing a voltage level.

At the comparator 112, the voltage measurement signal 106 may be interpreted as follows: a zero for a particular bit indicates that the sampled power supply voltage is greater than or equal to the voltage level represented by the particular bit, and a "1" for the particular bit indicates that the sampled power supply voltage is less than or equal to the voltage level represented by the particular bit. At the comparator 112, the voltage reference signal 114 is interpreted as follows: a "0" for a particular bit indicates that a threshold voltage level does not equal the voltage represented by the particular bit, and a "1" for the particular bit indicates that the threshold voltage level equals the voltage level represented by the particular bit.

In contrast to the voltage measurement signal 106, the voltage reference signal 114 will have only a single bit set to one. That bit represents the threshold voltage level. With that in mind, the operation of the comparator 112 may be understood. Specifically, the comparator 112 operates to select a single bit from the voltage measurement signal 106 by a bit-wise comparison between the voltage reference signal 114 and the voltage measurement signal 106. The comparator 112 may be implemented as a simple multiplexer rather an generic digital comparator. A simple multiplexer may be used because of the specific formulation of data used to represent voltages. In particular, all bits between the two signals are compared, and the comparison involving the single bit set to "1" in the voltage reference signal will determine the output of the comparator 112. The bit selected by this comparison will be a "1" or a "0." If the selected bit is a "1", the power supply voltage is below the threshold voltage. If the selected bit is a "0", the power supply voltage not below the threshold voltage. The comparator 112 is efficient and expandable to many bits. Use of the comparator 112 eliminates the need for a complicated digital comparator that would be slow and restricted to a small number of bits.

This functionality may be implemented at the gate-level as shown in FIG. 4. FIG. 4 shows a comparator 112 having a plurality of AND gates 404. Each AND gate 404 is configured to receive as input a bit from the voltage measurement signal 106 and a corresponding bit from the voltage reference signal 114. Based on this input, each AND gate 404 is configured to output a logical AND of the two input signals. The comparator 112 additionally includes an OR gate 408 configured to receive the output from each of the AND gates 404 as a plurality of inputs and configured to output a logical OR of the plurality of inputs. The output from the OR gate 408 is output from the comparator 112 as the voltage droop signal 110. The comparator 112 has the advantage of avoiding complicated digital comparator circuits that can typically achieve comparison up to 64 bits within a CPU cycle. The comparator 112 described here may be tailored to this special application and can expand easily to more than 256 bits comparisons achieved within a CPU cycle.

Figure 5:
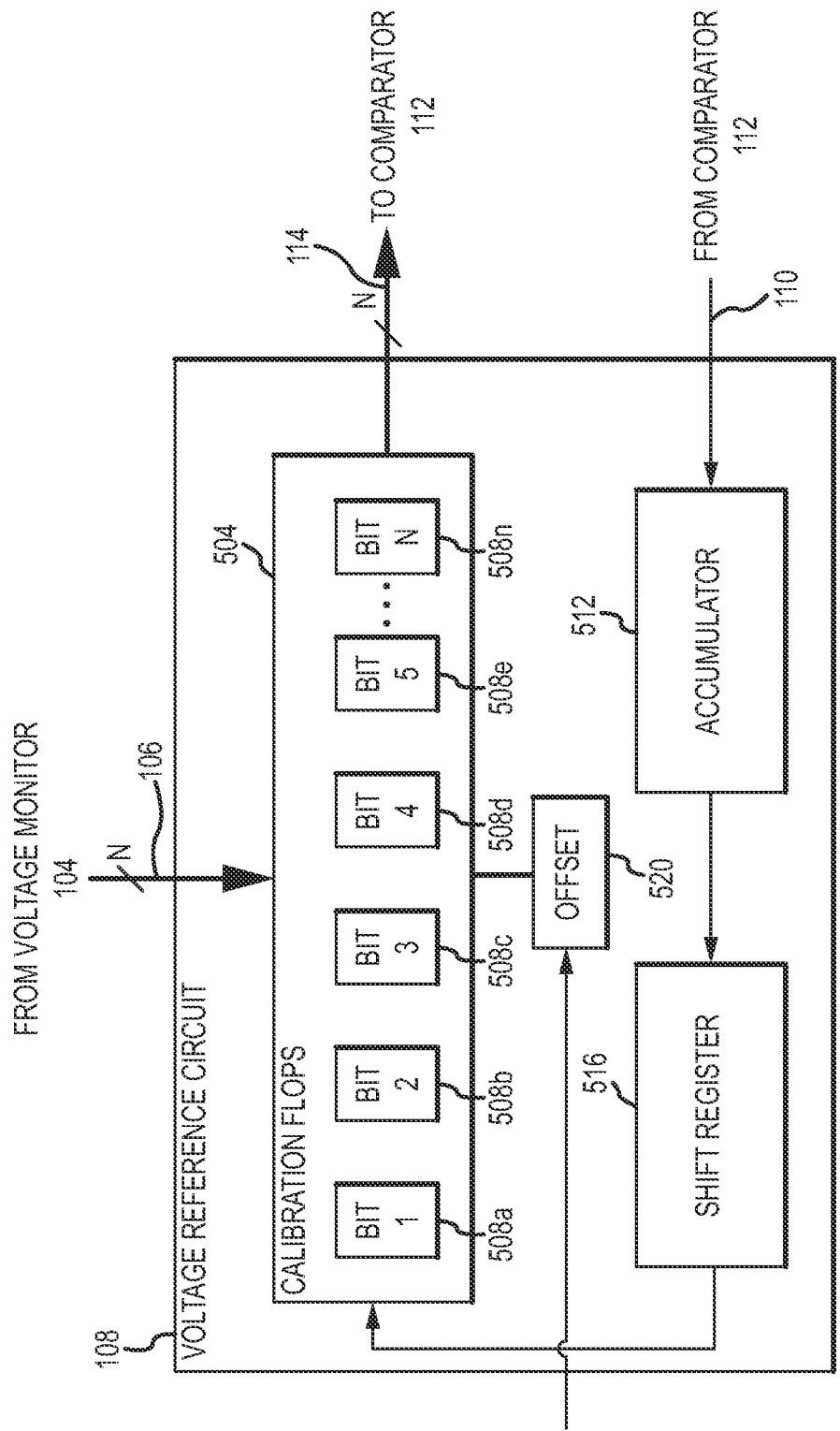
FIG. 5 is a schematic illustration of an embodiment of the voltage reference circuit of the digital voltage monitor shown in FIG. 1.

During initial or power-on calibration, the voltage monitor 104 output is stored in a group of flip-flops 504, as shown in FIG. 5. A programmable offset 520 applied during the calibration phase, creates a DC offset in the value stored in the flip-flops 504 to create a hysteresis that is typical in closed loop control systems. This minimizes "false" or very repetitive triggering due to small noise excursions. During normal operation, the voltage monitor output 104 is compared against the stored threshold value that includes the predetermined offset. If the power supply voltage drops below the threshold, the voltage droop signal 110 is asserted. Two actions are possible in this case: stop the clock temporarily until the voltage recovers, or use a divided by two clock frequency to avoid setup violations.

The voltage reference circuit shown in FIG. 5 has self-calibration circuitry that includes an accumulator 512 and a shift register 516. The accumulator 512 may be implemented as an up/down counter that increases its output value by one every time an "1" appears at the output of the comparator 112. Likewise, the accumulator 512 decreases the accumulated result by one every time a "0" appears at the comparator 112 output. The accumulator 512 may accumulate data for hundreds to thousands of CPU cycles, depending on the application. The number data points so accumulated may depend on a user defined sampling count expressed in CPU cycles. Every time this number is reached, the output of the accumulator 512 is sampled by the shift register 516.

If there is no overflow from the accumulator 512 in the positive or negative direction, then the shift register 516 takes no action. If there is an overflow in the positive direction, then this signals to the shift register 516 to shift the reference bit set by the flip-flops 504 one position to the left. This will move the threshold voltage to a lower level. When the overflow is in the negative direction then the shift register 516 will shift the reference data to the right. This will move the reference point to a higher value. This shift of the reference bits to the right or left depends on the overflow sign and the offset added during the power on calibration. This process adjusts the threshold voltage to center around the long term power supply voltage, achieving, in this way a continuous calibration that reacts only to the average move of power supply voltage. After every sampling of the accumulator 512, the accumulator 512 may be reset.

Figure 6:
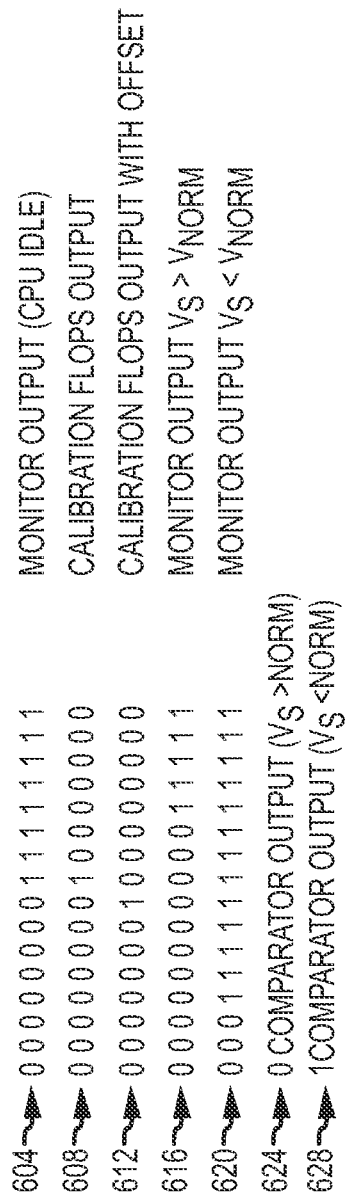
FIG. 6 is an illustration of digital signals associated with the digital voltage regulator shown in FIG. 1.

FIG. 6 shows output code for various signals shown in FIG. 1. Output code 604 is the digital output of the voltage monitor 104 while the CPU is idle. This output may be used as reference during power-up. Output code 608 shows a threshold voltage signal output by the voltage reference circuit that represents the initial power-up voltage. An offset 520 may be included during calibration that provides a DC offset required to implement the hysteresis threshold discussed in connection with FIG. 5. Output code 612 shows a threshold voltage signal that includes this DC offset. This offset may be programmable and thus can be extended if needed.

In FIG. 6, output code 616 shows the voltage monitor 104 output when the power supply voltage is above normal operating conditions. Output code 620 shows the voltage monitor 104 output when the power supply voltage is less than normal operating conditions. Observe the shift in the chain of 1's and 0's from output code 616 to output code 620. The bits output by the voltage reference circuit 108 and which represent the threshold voltage are provided to the select lines of the comparator 112, and the output of the voltage monitor 104 (during normal operation) is provided to the data input of the comparator 112. In the case where the power supply voltage is less than the threshold voltage, the calibration flip-flip with an output of "1" selects a data point that is also "1" so that the comparator output will be "1" as well. This is shown in FIG. 6 by output code 628. In the case where the power supply voltage is less than the threshold voltage, the calibration flip-flop with an output of "1" selects a data point that is "0", and the comparator 112 output will be "0". This is shown in FIG. 6 by output code 628.

By sampling the power supply voltage with the voltage monitor 104 and providing a voltage droop signal with the comparator 112, the digital voltage regulator 100 is able to react to an unacceptable voltage droop condition within a single CPU clock cycle. This response time meets the stringent requirement of being less than one fourth of package/chip resonance frequency period. This stringent requirement stems from the fact that the voltage supply will reach the lowest point (largest droop) within ¼th of the resonance period. Such fast reaction cannot be achieved with external regulators that have typical response time in the range of micro-seconds.

Figure 7:
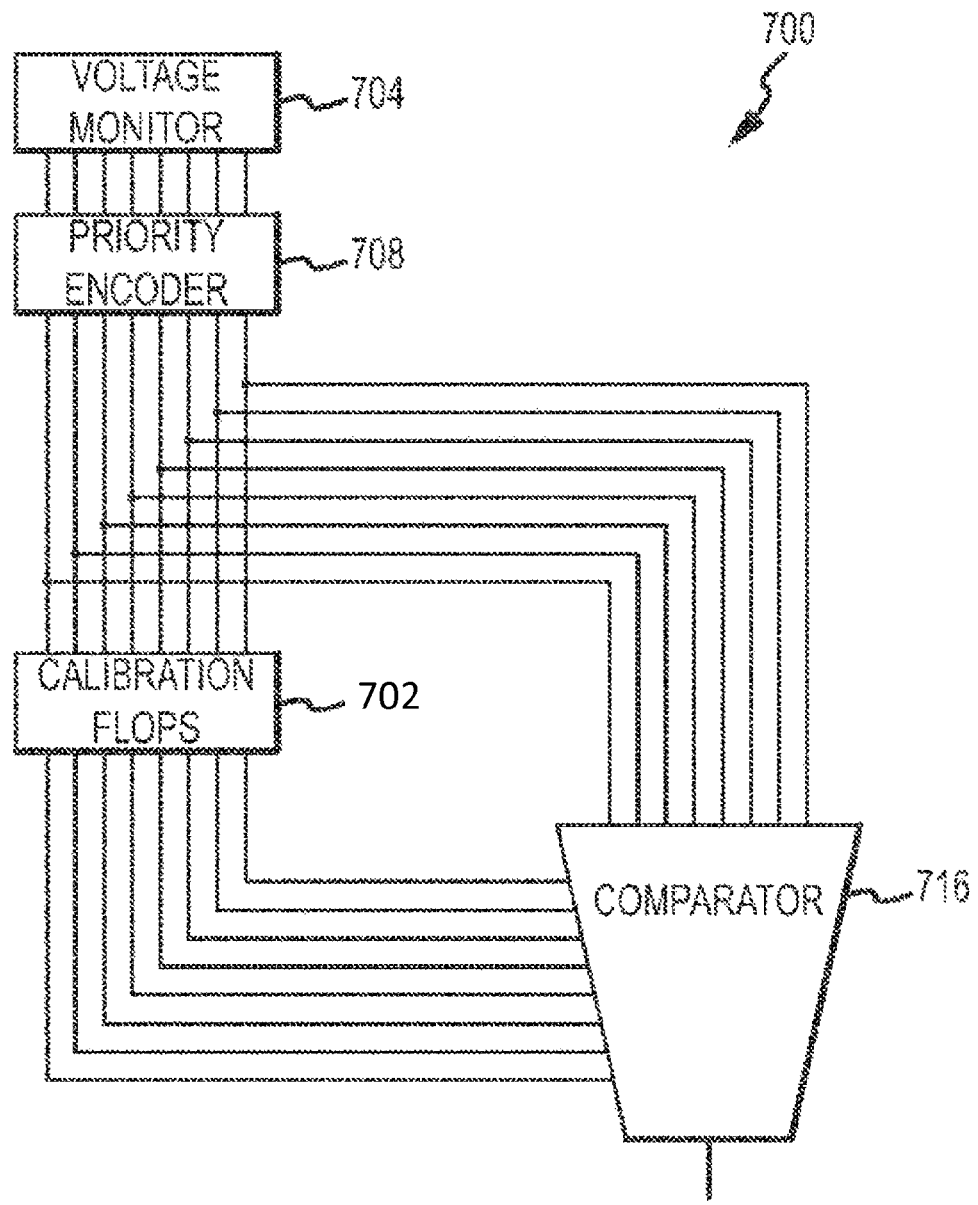
FIG. 7 is a schematic illustration of a digital voltage regulator circuit slice.

FIG. 7 shows the circuitry 700 called "slice" that contains a voltage monitor 704, calibration flops 702 that hold the threshold voltage as output from the voltage monitor 704, and a comparator 716. Like the comparator 112, the comparator 716 may be a multiplexer rather than a generic digital comparator. Each slice circuit 700 has 8-bits. A number of slice circuits 700 can be connected "side by side" as shown in FIG. 8 to form an expanded version of the digital voltage regulator 100 with increased and adjustable voltage detection range while maintaining high accuracy and single cpu cycle operation.

The slice circuit shown the FIG. 7 additionally includes a priority encoder 708 connected to the output of the voltage monitor 704. The priority encoder 708 may operate to mitigate the effect of propagation "bubbles" in the voltage monitor's 704 delay line. This effect may occur when the delay line is shorter than the setup and hold time of the flip flops and, as a result, false triggering results on the flip-flop closest to the wavefront or on some of the other flip-flops downstream. This causes propagation of bubbles. To mitigate this effect, the output of the delay circuit may be inputted into a priority encoder 704, which gives priority to the most significant bit of the voltage monitor output 704 in order. Although not shown in FIG. 1, the digital voltage regulator 100 may include a priority encoder connected to the output of the voltage monitor 104.

Figure 8:
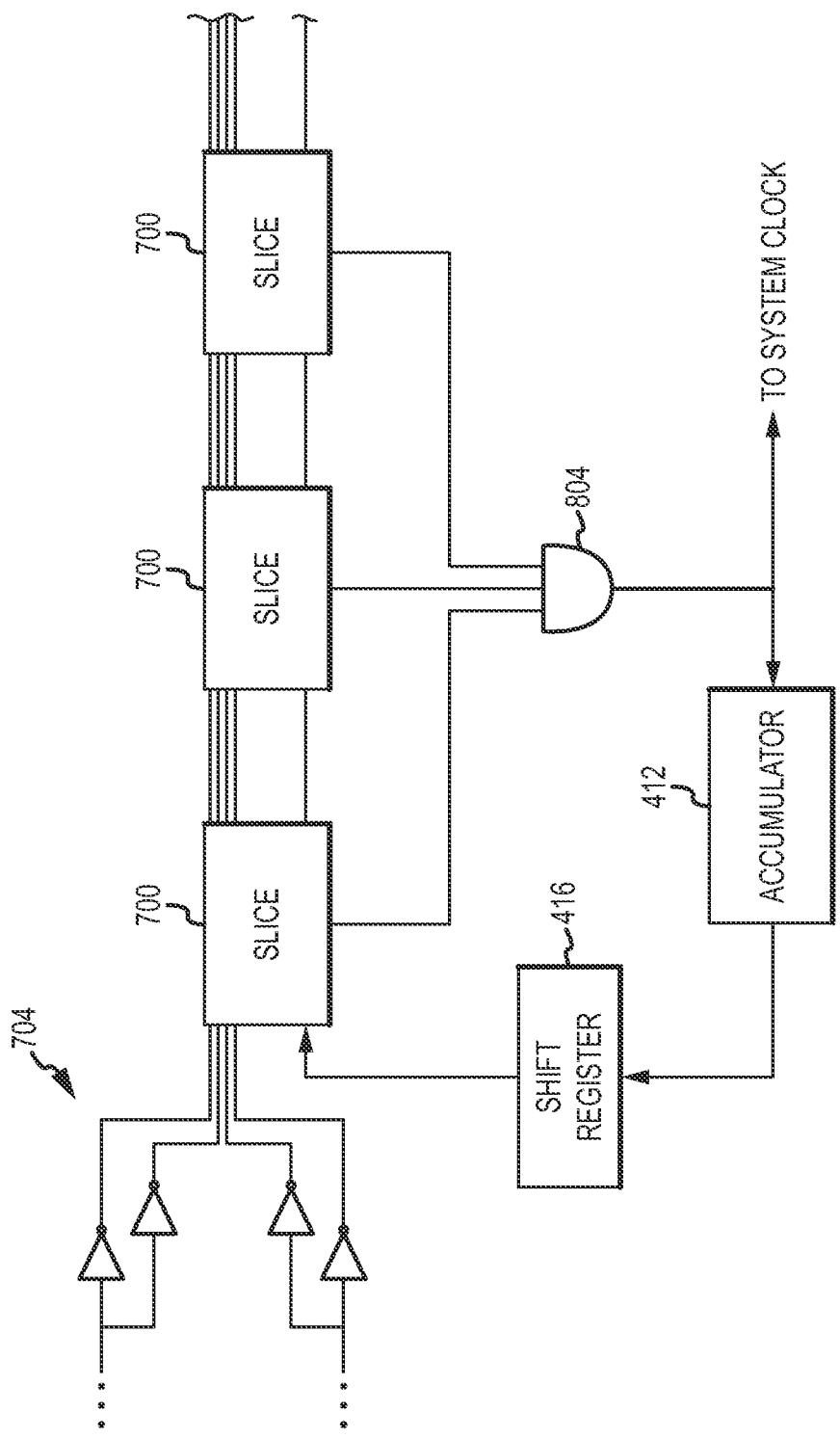
FIG. 8 is a schematic illustration of a digital voltage regulator circuit that includes a number of the digital voltage regulator circuit slices shown in FIG. 7.

In FIG. 8, the outputs of the comparators 716 in the various slices 700 are connected to a wide OR gate 804. If one multiplexer output is "1" indicating that in this cycle Vsupply<Vnom, then the feedback control will be activated to recover the voltage droop. If all multiplexer outputs are "0" indicating that Vsupply>Vnom, the wide OR 804 output will be zero, and no action is taken. The output from the wide OR gate 804 is also fed back to an accumulator 412 and a shift register 416. As described in connection with FIG. 5, the accumulator 412 and the shift register 416 operate to adjust the threshold voltage to center on a long term average power supply voltage.

Figure 9:
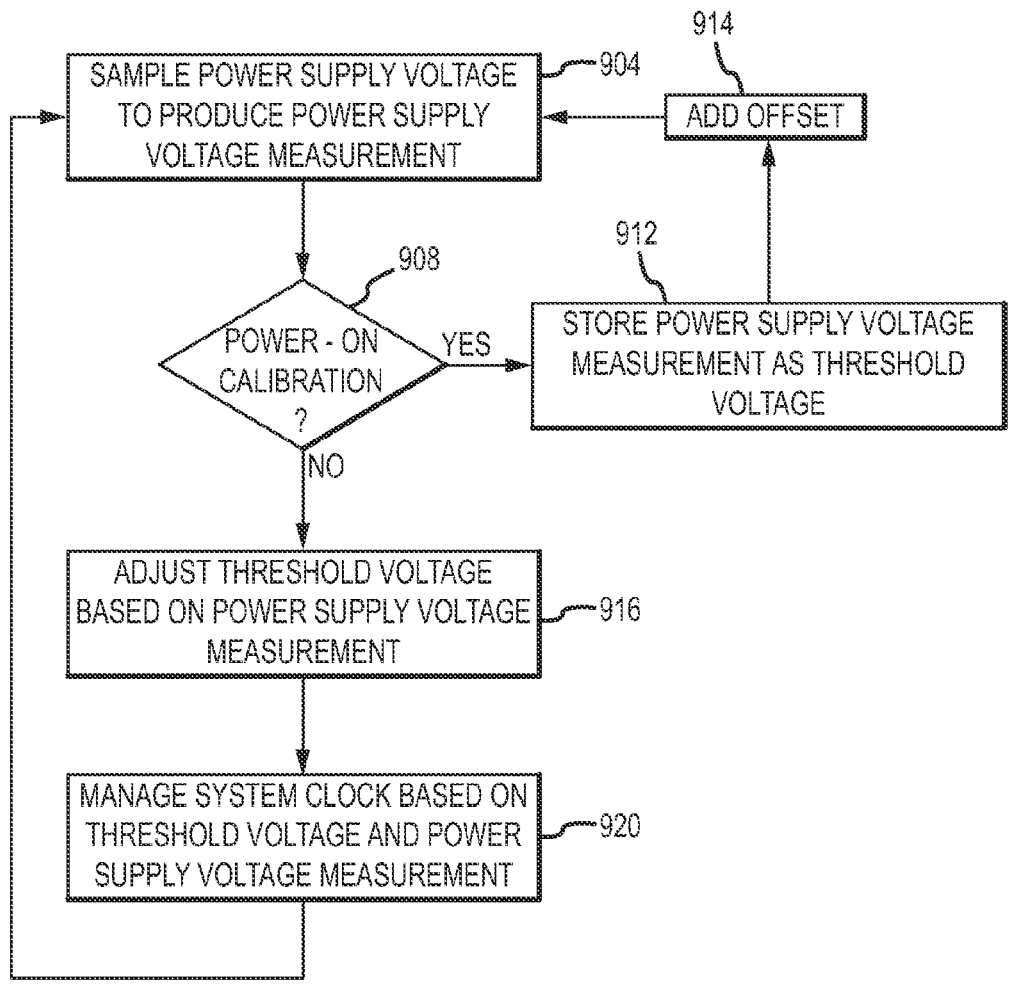
FIG. 9 is a flow chart illustrating a voltage regulation method in accordance with embodiments discussed herein.

FIG. 9 is a flowchart illustrating a method of mitigating voltage droop in accordance with implementations discussed herein. Initially, in operation 904, the integrated circuit's power supply voltage is sampled to produce a power supply voltage measurement. As described in connection with FIGS. 2 and 3, sampling a power supply voltage may include propagating a wave front down a delay chain and sampling that delay chain using a plurality of flip-flops. The power supply voltage measurement stored by the flip-flops may be passed to the voltage reference circuit 108 during the initial or power-on calibration. During normal operation, the power supply voltage measurement may be passed to the comparator 112. Accordingly, operation 908 may be executed following operation 904. In operation 908, a determination is made as to whether an initial or power-up calibration should occur. During power-on calibration, operation 912 may be executed following operation 908. During normal operation, operation 916 may be executed following operation 908.

In operation 912, the power supply voltage measurement is passed to the voltage reference circuit 108 where it is stored as a threshold voltage. As described above in connection with FIG. 5, this may include storing the threshold voltage in a plurality of calibration flops 504. Following operation 912, operation 914 may be executed. In operation 914, an offset 520 may be added to the threshold voltage stored by the calibration flops 504. Adding the offset 520 may provide a hysteresis needed for the operation of the feedback control mechanism. Following operation 914, operation 904 may again be executed.

In operation 916, the initial or power-on calibration has occurred. Accordingly, the power supply voltage measurement taken by the voltage monitor 104 is passed to the comparator 112. The comparator 112 then outputs a voltage droop signal 110 which, in operation 916, is fed back to the voltage reference circuit 108 in order to adjust the threshold voltage to center on a long-term average power supply voltage. Additionally, in operation 920, the voltage droop signal is used to manage the system clock. Specifically, if the power supply voltage measurement exceeds the set voltage threshold steps will be taken, such as disabling the system clock or reducing the system clock frequency in order to mitigate the voltage droop. Following operation 920, operation 904 may again be executed. The process of adjusting the threshold voltage is described in greater detail in FIG. 10. The process of managing the system clock is described in more detail in connection with FIG. 11.

Figure 10:
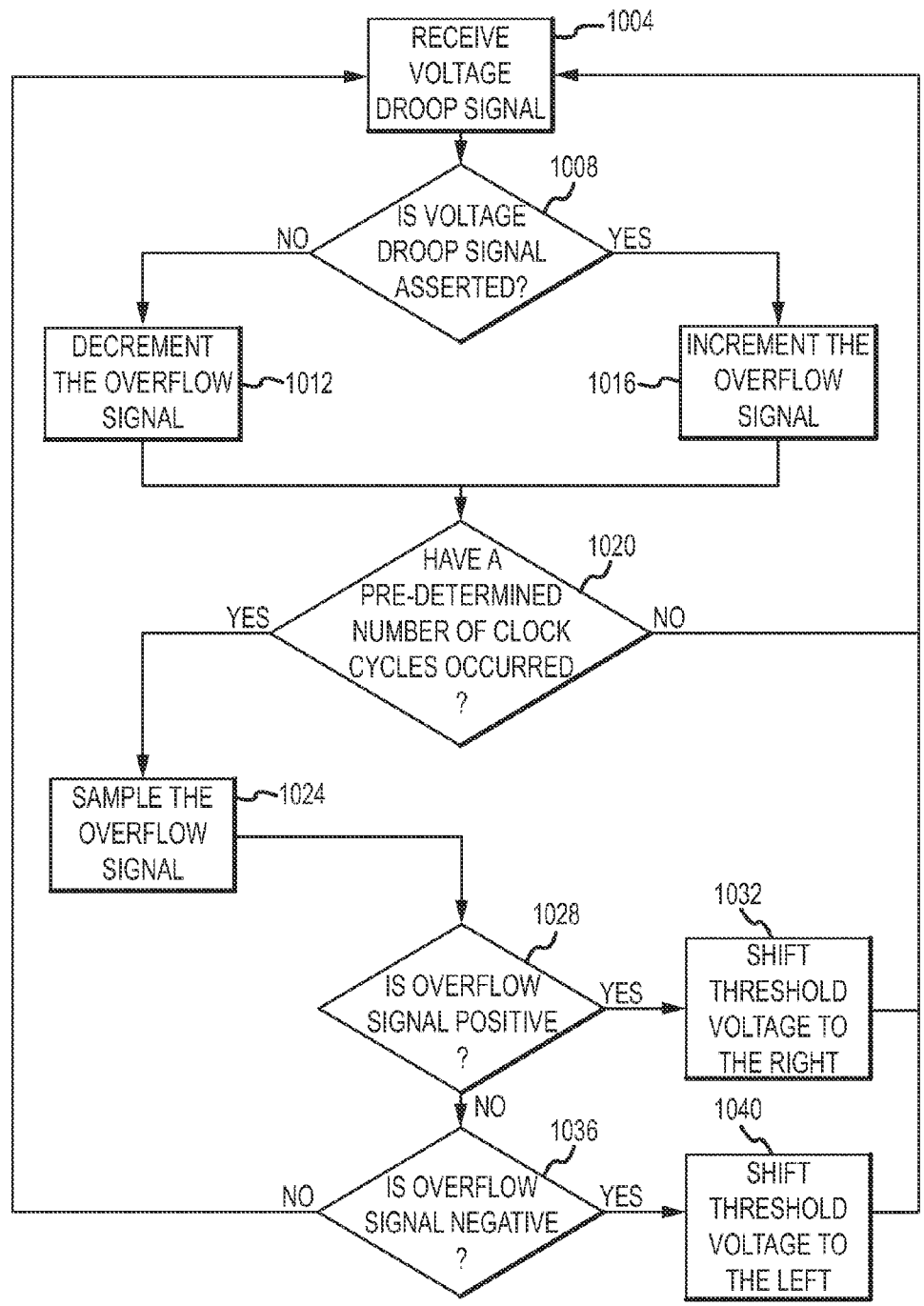
FIG. 10 is a flow chart illustrating a comparator method in accordance with embodiments discussed herein.

FIG. 10 is a flowchart that illustrates a method of adjusting a threshold voltage in accordance with embodiments discussed herein. Initially, in operation 1004, a voltage droop signal 110 is received. As can be seen in FIG. 5, the voltage droop signal 110 is received as feedback from the comparator 112. Following operation 1004, operation 1008 may be executed. In operation 1008, a determination is made as to whether the voltage droop signal is asserted. If the voltage droop signal 110 is asserted, operation 1016 may be executed. If the voltage droop signal 110 is not asserted, operation 1012 may be executed. In operation 1012 an overflow signal is incremented and in operation 1012 the overflow signal is decremented. As can be seen in FIG. 5, the overflow signal is output from an accumulator 512, which receives the voltage droop signal 110 as an input. Operation 1020 may be executed following either operation 1012 or operation 1016.

In operation 1020, a determination is made as to whether a predetermined number of clock cycles have occurred. The predetermined number of clock cycles may range in the tens to hundreds to thousands of clock cycles and may be adjusted by a user, designer or technician, as appropriate. If the predetermined number of clock cycles have not occurred, operation 1004 may again be executed following operation 1020. Here, the system receives the next voltage droop signal fed back from the comparator 112. If, however, the predetermined number of clock cycles has occurred, operation 1024 may follow operation 1020.

In operation 1024, the overflow signal output from the accumulator 512 is sampled. With reference to FIG. 5, the accumulator 512 is sampled by the shift register 516. Operation 1028 may be executed following operation 1024. In operation 1028, a determination is made as to whether the overflow signal received from the accumulator 512 is positive. If the overflow signal is positive, the shift register 516 operates to shift the threshold voltage to the right as set forth in operation 1032. If the overflow signal is not positive, operation 1036 may follow operation 1028. In operation 1036, a determination is made as to whether the overflow signal sampled from the accumulator is negative. If the overflow signal is negative, the shift register 516 may operate to shift the threshold voltage to the left as set forth in operation 1040. If the overflow signal is determined to not be negative, operation 1004 may follow operation 1036. Here, the accumulator 512 has output a value of "0"; accordingly, the threshold voltage is not adjusted and the system proceeds to receive further voltage droop signals 110 from the comparator 112. Following either operation 1032 or operation 1040, operation 1004 follows. Here, the system continues to receive voltage droop signals fed back from the comparator following an adjustment to the threshold voltage.

Figure 11:
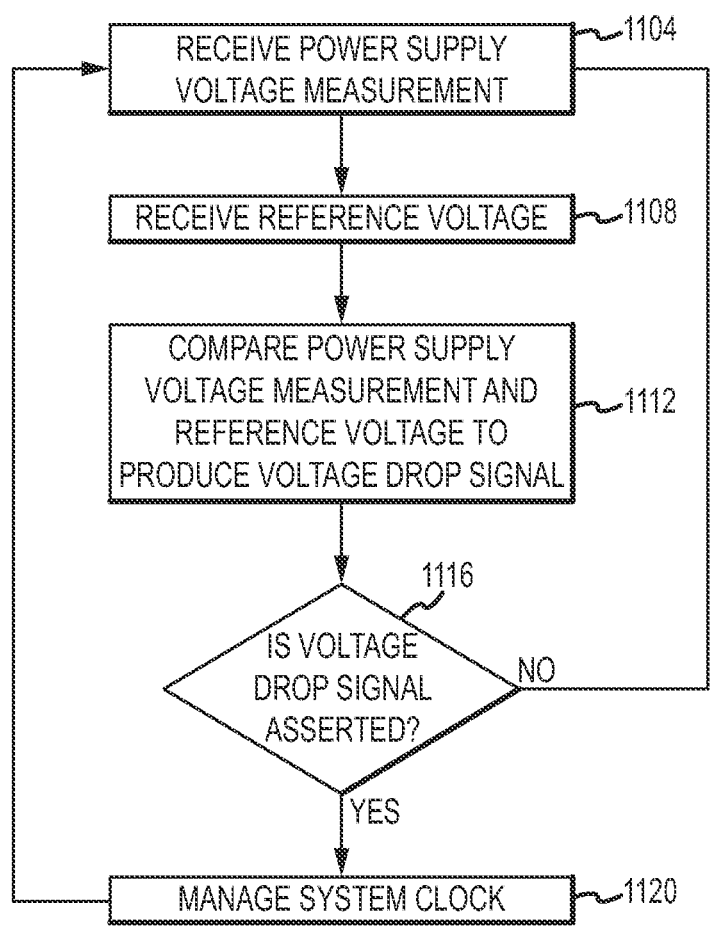
FIG. 11 is a flow chart illustrating a calibration method in accordance with embodiments discussed herein.

FIG. 11 is a flowchart illustrating a method of producing voltage droop signals 110 in accordance with implementations discussed herein. As described in connection with FIG. 1, the voltage droop signal 110 is used to mitigate voltage droop, as well as being fed back into the voltage reference circuit 108 in order to adjust the threshold voltage. Initially, in operation 1104, a power supply voltage measurement is received. As shown in FIG. 4, the power supply voltage measurement is received from the voltage monitor 104. Following operation 1104, operation 1108 may be executed. In operation 1108, a threshold voltage is received. As shown in FIG. 4, the threshold voltage may be received from the reference circuit 108. It should be appreciated that the threshold voltage may be received concurrently with the power supply voltage measurement or at some prior time. Following operation 1108, operation 1112 may be executed. In operation 1112 a comparison is made between the power supply voltage measurement and the reference voltage to produce a voltage droop signal 110. As shown in FIG. 4, this may be accomplished by a bitwise comparison between the power supply voltage measurement and the threshold voltage using a plurality of AND gates 404. The output from the plurality of AND gates may be fed into an OR gate 408 to produce the voltage droop signal 110.

Following operation 1112, operation 1116 may be executed. In operation 1116, a determination is made as to whether the voltage droop signal 110 is asserted. If the voltage droop signal 110 is not asserted, no voltage droop mitigation need occur. Accordingly, operation 1104 may again be executed following operation 1116. If, however, in operation 1116, the voltage droop signal 110 is asserted steps may be taken to manage the system clock as set forth in operation 1120. In operation 1120, the system may suspend the system clock or reduce the frequency of the system clock to reduce the amount of current demanded by the power supply. In so doing, the power supply voltage is allowed to recover. Following operation 1120, operation 1104 may again be executed to continue ongoing power supply voltage monitoring.

Figure 12:
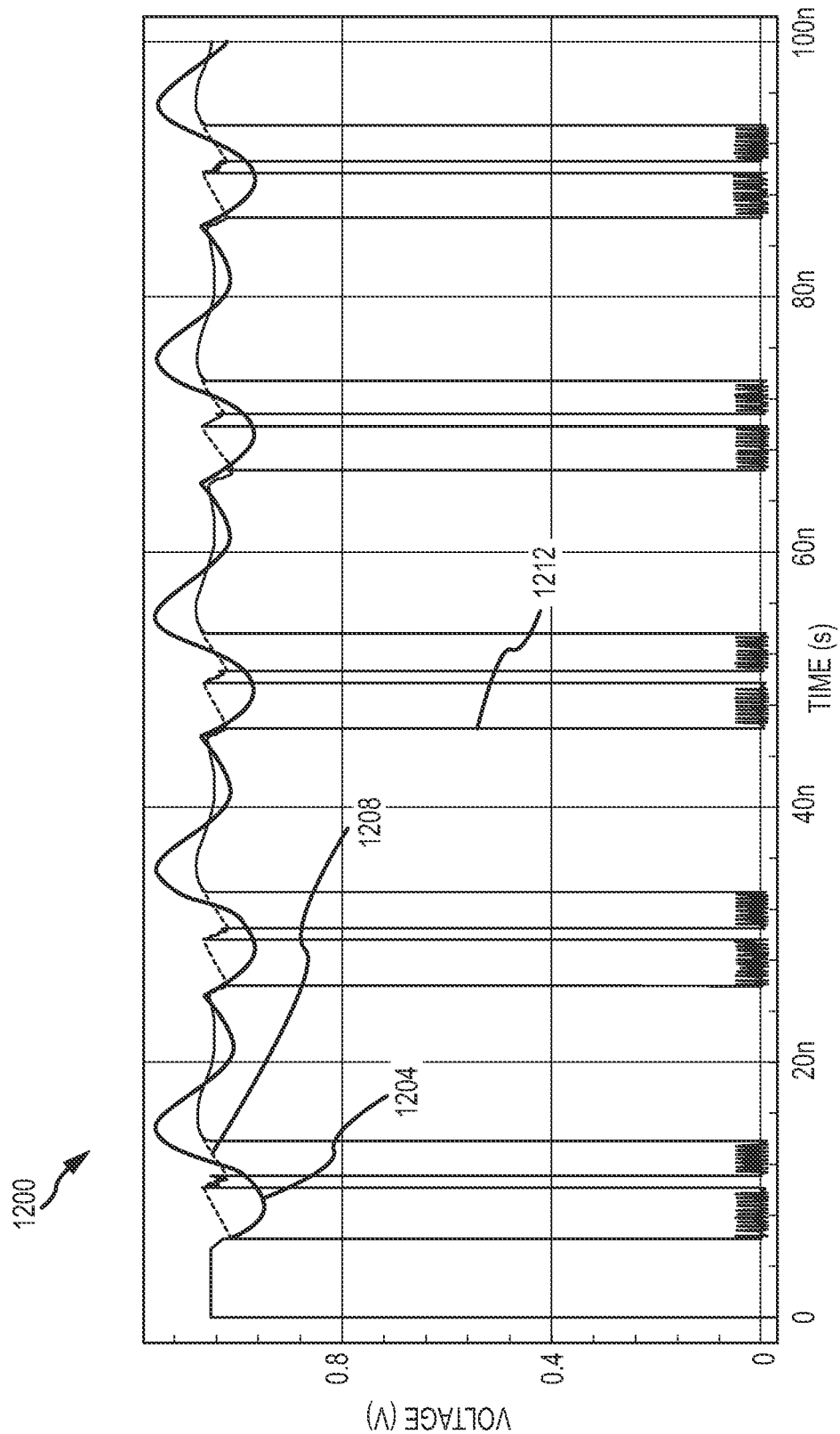
FIG. 12 is a simulation result for the digital voltage regulator of FIG. 1 operating under intermittent loading conditions.
Figure 13:
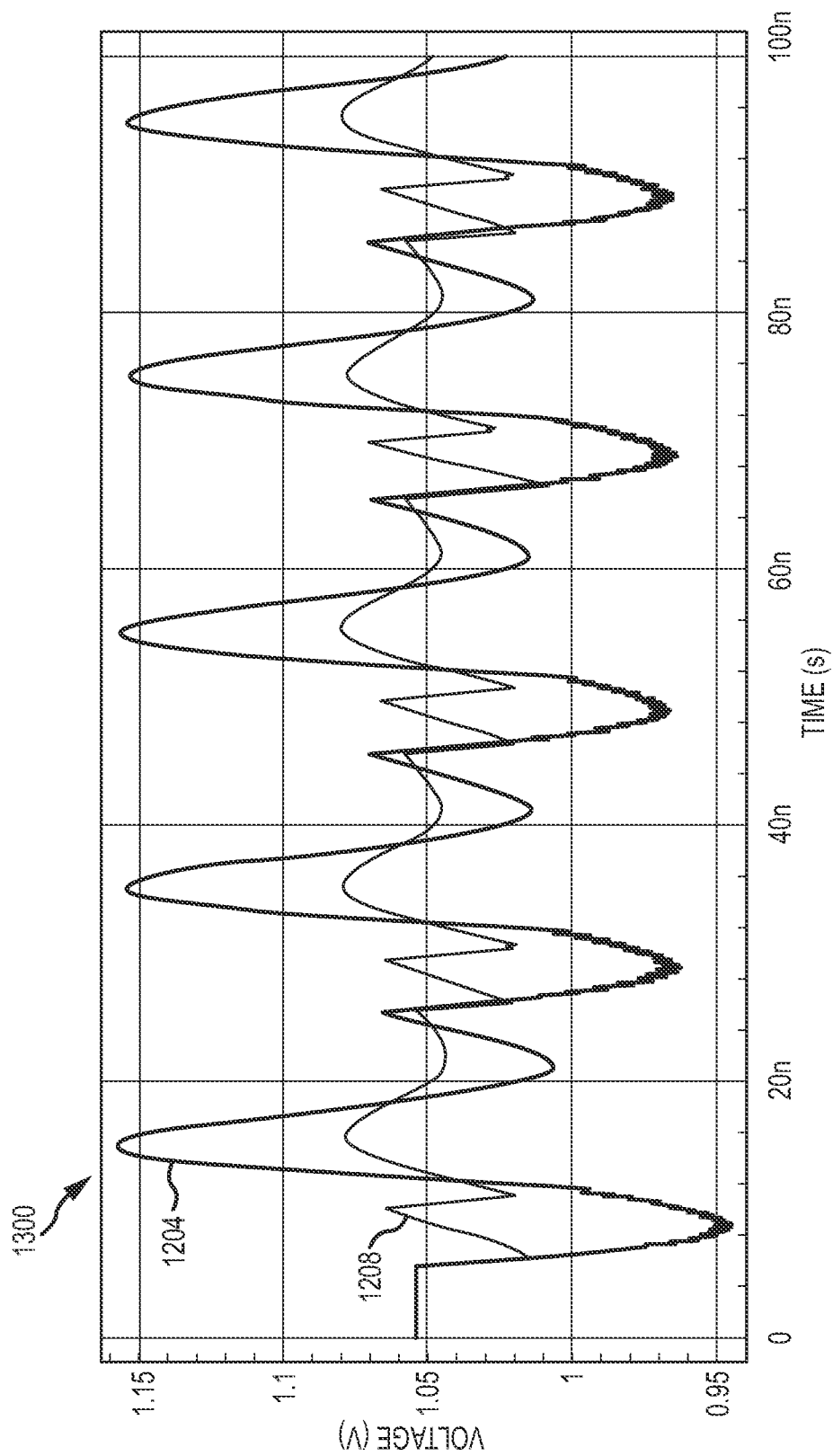
FIG. 13 is an enlarged view of a portion of the simulation result shown in FIG. 12.

FIGS. 12-15 show simulation results for the digital voltage regulator 100 shown in FIG. 1. FIG. 12 shows power supply voltage traces for a workload that causes the processor to start and stop in a way that typically creates large voltage droops. Trace 1204 shows the power supply voltage under these conditions without voltage droop mitigation. Trace 1208 shows the power supply voltage under these conditions with voltage droop mitigation. As can be seen, trace 1208 shows a smoother power supply voltage without the more substantial excursions in the positive and negative direction that are shown by trace 1204. FIG. 12 also include trace 1212, which represents the voltage droop signal 110, which is output from the digital voltage regulator 100. When the voltage droop signal 110 is at high voltage (logical "1"), the system clock is suspended to thereby allow the power supply to recover. When the voltage droop signal is at a low voltage (logical "0"), the system clock is not suspended and the processor operates normally. A high voltage for the voltage droop signal 110 may also cause the system clock's frequency to be divided thus allowing the power supply to recover by slowing rather than completely stopping the processor. FIG. 13 is an enlarged view of the power supply traces shown in FIG. 12.

Figure 14:
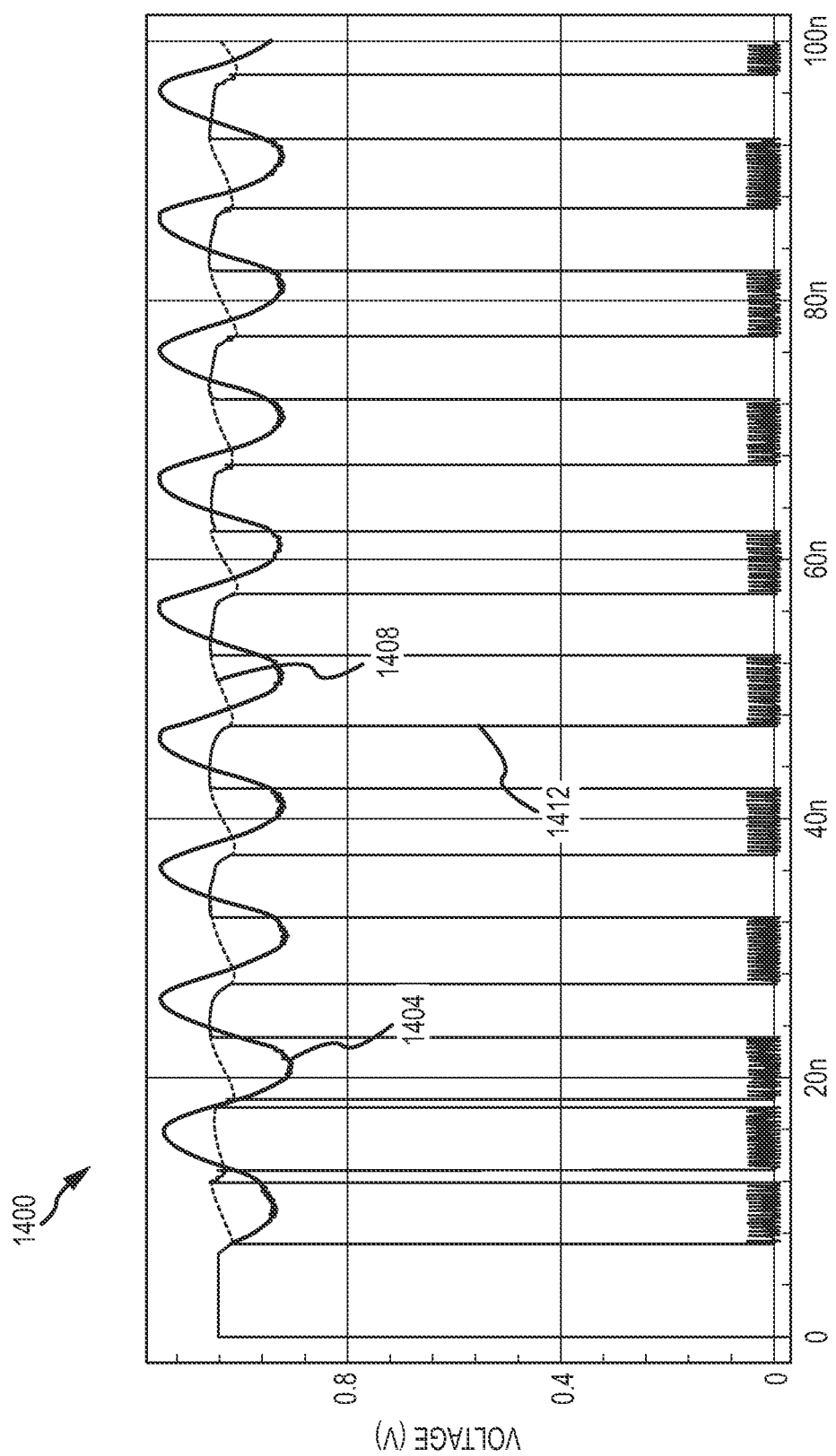
FIG. 14 is a simulation result for the digital voltage regulator of FIG. 1 operating under resonance conditions.
Figure 15:
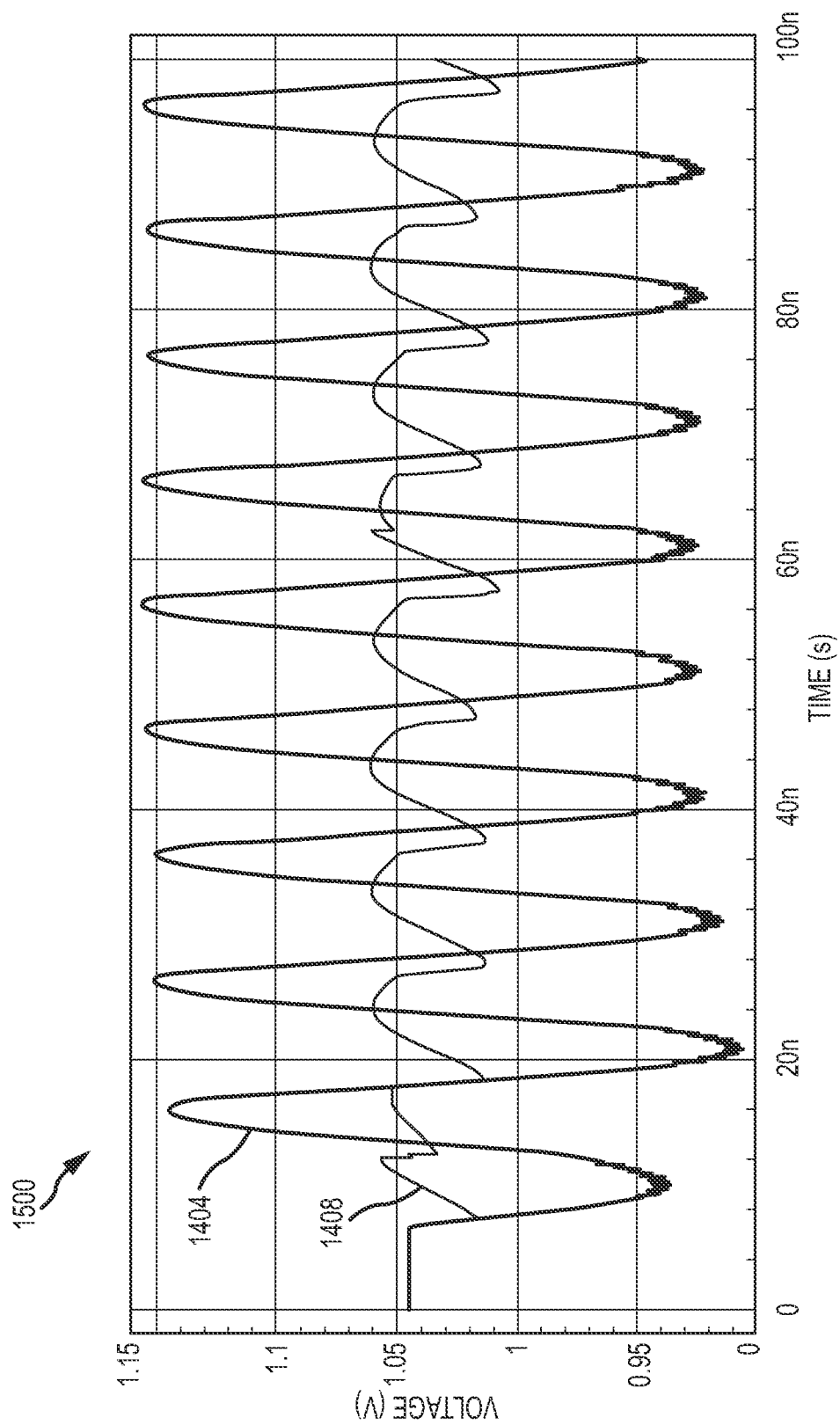
FIG. 15 is an enlarged view of a portion of the simulation result shown in FIG. 14.

FIG. 14 shows power supply voltage traces for a workload cause the processor to operate at a rate close to the package/chip resonance frequency. In this case, sudden changes in current through the package inductor cause voltage changes across the inductor. This voltage change is high when the rate of current changes equals the resonance frequency of the combination of the package inductor and the chip capacitance. Trace 1404 shows the power supply voltage under these conditions without voltage droop mitigation. Trace 1408 shows the power supply voltage under these conditions with voltage droop mitigation. As can be seen, trace 1408 shows a smoother power supply voltage without the more substantial excursions in the positive and negative direction that are shown by trace 1404. FIG. 14 also include trace 1412, which represents the voltage droop signal 110, which is output from the digital voltage regulator 100. When the voltage droop signal 110 is at high voltage (logical "1"), the system clock is suspended to thereby allow the power supply to recover. When the voltage droop signal is at a low voltage (logical "0"), the system clock is not suspended and the processor operates normally. A high voltage for the voltage droop signal 110 may also cause the system clock's frequency to be divided thus allowing the power supply to recover by slowing rather than completely stopping the processor. FIG. 14 is an enlarged view of the power supply traces shown in FIG. 13.

The foregoing merely illustrates certain principles of aspects of the invention with reference to circuit implementations that conform to inventive concepts. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. For example, while various embodiments have been described and illustrated with reference to active high signals, it should be understood that active low signals may also be used. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. A digital voltage regulator component of an integrated circuit, the digital voltage regulator comprising:
    a voltage monitor configured to determine a power supply voltage of an integrated circuit during a clock cycle and configured to output a representative power supply voltage measurement comprising an ordered sequence of bits;
    a voltage reference circuit connected to the voltage monitor and configured to output a voltage reference signal that is initially calibrated based on a first power supply voltage measurement received from the voltage monitor; and
    a comparator connected to the voltage monitor and to the voltage reference circuit and configured to assert a voltage droop signal when a power supply voltage measurement received from the voltage monitor falls below the voltage reference signal received from the voltage reference circuit;

wherein the voltage reference circuit receives the voltage droop signal from the comparator and adjusts the voltage reference signal based on a plurality of voltage droop signal values received over time.

2. The digital voltage regulator of claim 1, the voltage monitor comprising:
a delay chain configured to propagate a wave-front through a plurality of stages during the clock cycle at a rate that is dependent on the power supply voltage; and
a plurality of flip-flops each connected to a corresponding stage in the delay chain, the plurality of flip-flops configured to sample the delay chain on a clock edge and to output a plurality of sampled values as the representative power supply voltage measurement.

3. The digital voltage regulator of claim 2, wherein the delay chain includes a single rail of interconnected inverters.

4. The digital voltage regulator of claim 2, wherein the delay chain includes a first rail of interconnected inverters and a second rail of interconnected inverters, the first and second rails being interconnected through a plurality of cross-couple inverter pairs, wherein the cross-couple inverter pairs feed signals forward in the delay chain.

5. The digital voltage regulator of claim 1, the voltage reference circuit comprising:
an accumulator configured to receive the voltage droop signal and to output an overflow signal, wherein if an asserted voltage droop signal is received a value of the overflow signal is incremented, and if a de-asserted voltage droop signal is received the value of the overflow signal is decremented;
a shift controller connected to the accumulator, the shift controller configured to sample the overflow signal after a pre-determined number of clock cycles and configured to output a shift signal corresponding to the sampled overflow signal; and
a plurality of calibration flip-flops connected to the voltage monitor and to the shifter controller, the plurality of calibration flip-flops configured to store the output from the voltage monitor as the voltage reference signal at a first time and to thereafter shift the voltage reference signal based on the shift signal.

6. The digital voltage regulator of claim 1, wherein
each bit of the representative power supply voltage measurement represents a voltage level, a logical zero for a particular bit indicating that the sampled power supply voltage is greater than or equal to the voltage level represented by the particular bit, a logical one for the particular bit indicating that the sampled power supply voltage is less than or equal to the voltage level represented by the particular bit;
the voltage reference signal is an ordered sequence of bits, each bit representing a voltage level, a logical zero for a particular bit indicates that a threshold voltage level does not equal the voltage represented by the particular bit, a logical one for a particular bit indicates that the threshold voltage level equals the voltage level represented by the particular bit;
the comparator comprising:
a plurality of first gates, each first gate configured to receive a bit representing a particular voltage level from the representative power supply voltage measurement as a first input, and a bit representing the particular voltage level from the voltage reference signal as a second input, and configured to output a logical AND of the first and second input;
a second gate configured to receive the output from each of the first gates as a plurality of inputs and configured to output a logical OR of the plurality of inputs as the voltage droop signal.

7. The digital voltage regulator of claim 1, further comprising:
a priority encoder configured to receive the output from the voltage monitor, the priority encoder configured to provide output to the voltage reference circuit and to the comparator.

8. The digital voltage regulator of claim 1, wherein an asserted voltage droop signal causes a system clock to suspend.

9. The digital voltage regulator of claim 1, wherein an asserted voltage droop signal causes a system clock to operate at a reduced frequency.

10. The digital voltage regulator of claim 1, wherein the initial calibration of the voltage reference signal includes adding an offset to the first representative power supply voltage measurement received from the voltage monitor.

11. A method of regulating voltage in an integrated circuit, the method comprising:
receiving a representative power supply voltage measurement and a voltage reference signal, wherein the representative power supply voltage measurement is produced by:
propagating a wave-front through a plurality of stages of a delay chain during a clock cycle at a rate that is dependent on the power supply voltage;
sampling the delay chain on a clock edge with a plurality of flip-flops each connected to a corresponding stage in the delay chain; and
outputting the sampled delay chain values as the representative power supply voltage measurement; and
outputting a voltage droop signal based on the representative power supply voltage measurement and the voltage reference signal, the voltage reference signal produced by:
setting a voltage reference level based on an initial power supply voltage measurement; and
shifting the voltage reference level based on a plurality of voltage droop signals received over time.

12. The method of regulating voltage of claim 11, wherein shifting the voltage reference value comprises:
producing an overflow signal from a plurality of voltage droop signals by incrementing the overflow signal if an asserted voltage droop signal is received and decrementing the overflow signal if a de-asserted voltage droop signal is received;
producing a shift signal from the overflow signal by sampling the overflow signal after a pre-determined number of clock cycles;
receiving the overflow signal at a plurality of calibration flip-flops, the plurality of calibration flip-flops configured to store a power supply voltage measurement at a first time as the voltage reference level; and
shifting the voltage reference level based on the shift signal.

13. The method of regulating voltage of claim 11, wherein the representative power supply voltage measurement is an ordered sequence of bits, each bit representing a voltage level, a logical zero for a particular bit indicating that a sampled power supply voltage is greater than or equal to the voltage level represented by the particular bit, a logical one for the particular bit indicating that the sampled power supply voltage is less than or equal to the voltage level represented by the particular bit;

the voltage reference signal is an ordered sequence of bits, each bit representing a voltage level, a logical zero for a particular bit indicates that a threshold voltage does not equal the voltage represented by the particular bit, a logical one for a particular bit indicates that the threshold voltage equals the voltage level represented by the particular bit; and outputting the voltage droop signal comprises:
   outputting a plurality of logical AND signals of a plurality of first and second inputs, the first input being a bit from the representative power supply voltage measurement representing a particular voltage level, the second input being a bit from the voltage reference signal representing the particular voltage level;
   outputting a logical OR signal of the plurality of logical AND signals as the voltage droop signal.

14. The method of regulating voltage of claim 11, further comprising: suspending a system clock for on an asserted voltage droop signal.

15. The method of regulating voltage of claim 11, further comprising: reducing a system clock frequency on an asserted voltage droop signal.

* * * * *

UNITED STATES PATENT AND TRADEMARK OFFICE
CERTIFICATE OF CORRECTION

PATENT NO. : 8,648,645 B2  
APPLICATION NO. : 12/787135  
DATED : February 11, 2014  
INVENTOR(S) : Konstadinidis et al.

Page 1 of 1

It is certified that error appears in the above-identified patent and that said Letters Patent is hereby corrected as shown below:

In the Specification

In column 5, line 9, delete "measurements" and insert -- measurements. --, therefor.

In the Claims

In column 15, line 18, in Claim 14, delete "for on an" and insert -- on an --, therefor.

Signed and Sealed this  
Thirtieth Day of June, 2015

Michelle K. Lee  
*Director of the United States Patent and Trademark Office*